United States Patent
Theurer et al.

(10) Patent No.: US 7,979,995 B2
(45) Date of Patent: Jul. 19, 2011

(54) METHOD OF MEASURING A TRACK POSITION

(75) Inventors: Josef Theurer, Vienna (AT); Bernhard Lichtberger, Pregarten (AT)

(73) Assignee: Franz Plasser Bahnbaumaschinen-Industriegesellschaft m.b.H., Vienna (AT)

( * ) Notice: Subject to any disclaimer, the term of this patent is extended or adjusted under 35 U.S.C. 154(b) by 0 days.

(21) Appl. No.: 12/452,416

(22) PCT Filed: Jun. 16, 2008

(86) PCT No.: PCT/EP2008/004812
§ 371 (c)(1),
(2), (4) Date: Dec. 29, 2009

(87) PCT Pub. No.: WO2009/015728
PCT Pub. Date: Feb. 5, 2009

(65) Prior Publication Data
US 2010/0154233 A1    Jun. 24, 2010

(30) Foreign Application Priority Data
Jul. 31, 2007    (AT) .................. A 1197/2007

(51) Int. Cl.
*E01B 35/00* (2006.01)
(52) U.S. Cl. .............................. 33/287; 33/1 Q
(58) Field of Classification Search ............. 33/287, 33/1 Q, 523.1, 523.2, 651
See application file for complete search history.

(56) References Cited

U.S. PATENT DOCUMENTS

| | | | | |
|---|---|---|---|---|
| 2,485,810 A * | 10/1949 | Bienfait | .................. | 235/61 A |
| 3,314,154 A * | 4/1967 | Plasser et al. | .................. | 33/1 Q |
| 3,345,746 A * | 10/1967 | Plasser et al. | .................. | 33/1 Q |
| 4,103,547 A * | 8/1978 | Vrabel | .................. | 73/146 |
| 4,166,291 A * | 8/1979 | Shupe | .................. | 702/94 |
| 4,173,073 A * | 11/1979 | Fukazawa et al. | .................. | 33/1 Q |
| 4,658,730 A * | 4/1987 | von Beckmann et al. | .................. | 104/8 |
| 5,090,329 A | 2/1992 | Theurer | | |
| 5,157,840 A | 10/1992 | Henttinen | | |
| 5,203,089 A * | 4/1993 | Trefouel et al. | .................. | 33/338 |
| 5,613,442 A * | 3/1997 | Ahola et al. | .................. | 104/8 |
| 5,671,540 A * | 9/1997 | Davis | .................. | 33/287 |
| 6,634,112 B2 * | 10/2003 | Carr et al. | .................. | 33/287 |
| 7,050,926 B2 | 5/2006 | Theurer et al. | | |

FOREIGN PATENT DOCUMENTS

| | | |
|---|---|---|
| DE | 42 22 333 | 1/1993 |
| GB | 2 257 864 | 1/1993 |

OTHER PUBLICATIONS

International Search Report, Oct. 2008.

* cited by examiner

*Primary Examiner* — Christopher W Fulton
(74) *Attorney, Agent, or Firm* — Collard & Roe, P.C.

(57) ABSTRACT

Measurement of a track position is carried out in successive measurement sections (15), wherein the relative track position is registered in each case with the aid of a long chord (17), formed by a laser beam (16), which serves as reference line of a measuring system (9). During this; an angle enclosed by the two long chords (17) of two successive measurement sections (15) is measured in order to thereby obtain a spatial curve reproducing the actual position of the track.

3 Claims, 1 Drawing Sheet

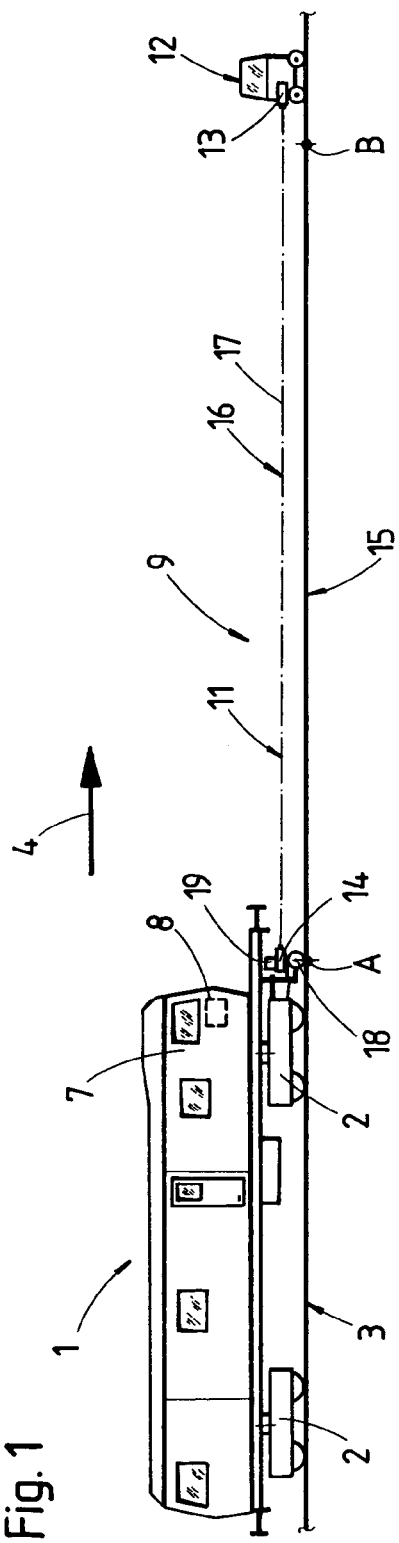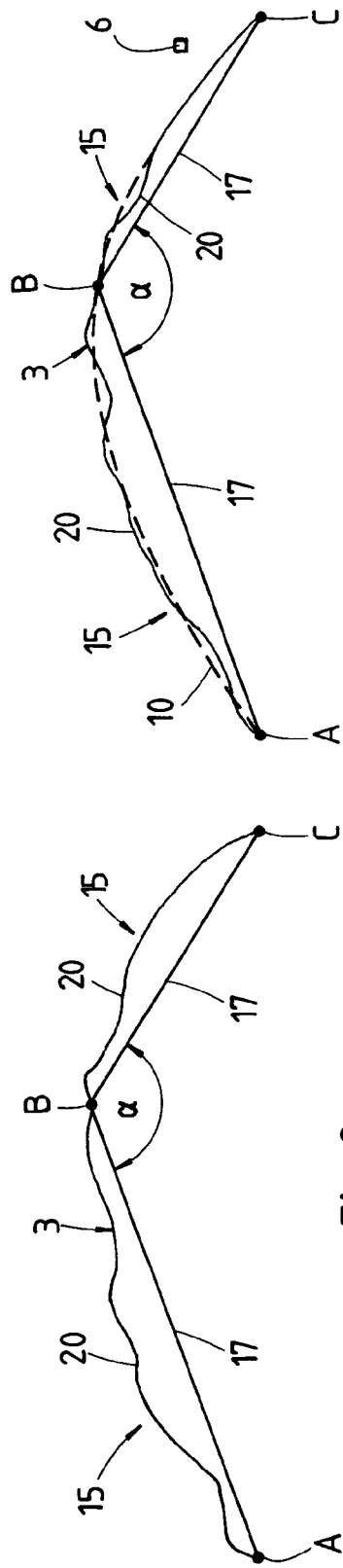

METHOD OF MEASURING A TRACK POSITION

CROSS REFERENCE TO RELATED APPLICATIONS

This application is the National Stage of PCT/EP2008/004812 filed on Jun. 16, 2008, which claims priority under 35 U.S.C. §119 of Austrian Application No. A 1197/2007 filed on Jul. 31, 2007. The international application under PCT article 21(2) was not published in English.

The invention relates to a method of measuring a track position in successive measurement sections, wherein the relative track position is registered in each case with the aid of a long chord, formed by a laser beam, which serves as reference line of a measuring system.

A method of this type is known from U.S. Pat. No. 7,050,926, wherein a track measuring car with a laser receiver is moved in the direction towards a satellite trolley standing still in place. During this, a laser beam is traced which is emitted by a laser sender positioned on the satellite trolley. The correction values determined for the track are recorded and relayed to a tamping machine for carrying out a track position correction.

From U.S. Pat. No. 5,090,329, a track measurement is known which is executed with a measuring system associated with a tamping machine. Said measuring system comprises an independently mobile satellite trolley positioned in front of the tamping machine in the working direction, the trolley having a laser sender. Associated with the tamping machine is a laser receiver which is situated at a front end of a machine-specific reference system.

For detecting the position of a fixed point, the satellite trolley is placed in proximity to the same, and a long chord formed by the laser sender is brought into a target position. The tamping machine then works in the direction towards the satellite trolley which is standing still. Subsequently, the satellite trolley is moved to the next fixed point, and a long chord is formed anew.

It is the object of the present invention to create a method of the type mentioned at the beginning with which it is possible to optimise the track position measurement, particularly in track curves, even when fixed point values are missing.

According to the invention, this object is achieved with a method of the specified kind in that an angle α enclosed by the two long chords of two successive measurement sections is measured.

With such an angle measurement, it is now possible to obtain a cohesive position location image of the spatial position of the entire track curve, even in track curves without fixed point data. The special advantage now lies in the fact that, for correction of the actual position of the track curve, it is possible to carry out a long-wave fault compensation encompassing several measurement sections. Additionally, it is alternatively possible, in connection with a subsequent registration of fixed points, to achieve an absolute position and marking of the track.

Further advantages of the invention become apparent from the dependent claims and the drawing description.

The invention will be described in more detail below with reference to an embodiment represented in the drawing in which FIG. 1 shows a schematic side view of a track measuring car with an satellite trolley for surveying a measurement section, and FIGS. 2, 3 each show an image of two successive measurement sections.

A track measuring car 1, shown in FIG. 1, is mobile via on-track undercarriages 2 on a track 3 in a working direction 4. Located in a front driver's cab 7 is a control- and computing unit 8.

A measuring system 9 for detecting the track position consists of a laser reference system 11. The latter comprises a satellite measuring trolley 12, mobile independently on the track 3, which has a laser sender 13. Associated with the latter is a laser receiver 14 located on a front measuring axle 18 of the track measuring car 1. An inertial measuring system (IMU) 19 is also arranged on said measuring axle 18.

A measurement section 15 is delimited, on the one hand, by a point A at which the track measuring car 1 starts tracing the track 3 with the aid of a long chord 17 formed by a laser beam 16 of the laser sender 13. On the other hand, the measurement section 15 is concluded (see point B) as soon as the track measuring car 1, while continuously registering actual position data, has arrived at the satellite measuring trolley 12 which is standing still in place.

FIG. 2 shows two successive measurement sections 15 of the track 3, which are delimited by points A,B and B,C. Each measurement section 15 contains a long chord 17 and an actual position 20 of the track 3. When the track measuring car 1 starts the measuring run at point A, the spatial coordinates for point A are registered with the aid of the inertial measuring system 19 and stored in the computing unit 8. After the spatial coordinates for points B and C have also been registered, an angle α is calculated which is enclosed by the two successive long chords 17.

With this continual angle measurement, it is possible to compute, by integration, the location image or the course of the position of the track 3 with regard to level, line and cant with the corresponding space coordinates. The spatial actual position 20 of the track 3, which has thus been determined and stretches over several measurement sections 15, is then smoothened by calculation—with regard to both the vertical and lateral position—by superimposition of a long-wave compensation curve 10 (see FIG. 3). In addition, it would be possible in further sequence to compute a sliding spline over a length of 100 meters, for example. This would have the effect that fault wave lengths of up to 100 meters could be eliminated without problem. The compensation curve 10 yields the actual position for a track position correction to be carried out later by a tamping machine. The stored data can be relayed to a tamping machine by means of a disc or by radio transmission, for example.

Parallel to surveying the track position, it is possible in an advantageous way to also carry out a survey of fixed points 6 which are integrated in the found compensation curve 10.

The invention claimed is:

1. A method of measuring a track position which is registered relative to a long chord (17), formed by a laser beam (16), which serves as reference line of a measuring system (9) while forming successive measurement sections (15), wherein a measurement section (15) is delimited by the start of a measuring run (point A) of a track measuring car (1) and by the conclusion of the measuring run (point B), after which a satellite measuring trolley (12) which is stationary locally on the track during the measuring run is moved forward, while being distanced from the track measuring car (1), for forming an adjoining measuring section (15) which is finished with the conclusion (point C) of the next following measuring run of the track measuring car (1), wherein an angle α enclosed by the two long chords (17) of two successive measurement sections (15) is measured by an inertial measuring system (19) registering the spatial coordinates of the long chords (17), and wherein the individual measurement sections (15) are joined together with the aid of the respective values of the angle measurement to form a spatial location image.

2. A method according to claim 1, wherein, as the target position of the track, a long-wave compensation curve (10) is computed over several successive measurement sections (15).

3. A method according to claim 1, wherein, parallel to the measurement procedure, fixed points (6) positioned adjacent to the track (3) are registered as to their position relative to the track (3).

* * * * *